(12) United States Patent
Martin et al.

(10) Patent No.: US 9,272,905 B2
(45) Date of Patent: Mar. 1, 2016

(54) METHOD FOR OPTIMIZING DOWN FIRED REFORMING FURNACES

(71) Applicant: Honeywell International, Inc., Morristown, NJ (US)

(72) Inventors: Richard Ray Martin, Tulsa, OK (US); Matthew Martin, Tulsa, OK (US)

(73) Assignee: HONEYWELL INTERNATIONAL, INC., Morris Plains, NJ (US)

( * ) Notice: Subject to any disclaimer, the term of this patent is extended or adjusted under 35 U.S.C. 154(b) by 151 days.

(21) Appl. No.: 14/191,649

(22) Filed: Feb. 27, 2014

(65) Prior Publication Data
US 2015/0239736 A1    Aug. 27, 2015

(51) Int. Cl.
*C01B 3/02*    (2006.01)
*C01B 3/38*    (2006.01)

(52) U.S. Cl.
CPC .............. *C01B 3/384* (2013.01); *C01B 3/386* (2013.01); *C01B 2203/0233* (2013.01); *C01B 2203/0255* (2013.01); *C01B 2203/0816* (2013.01); *C01B 2203/1241* (2013.01)

(58) Field of Classification Search
CPC .................. C01B 2203/0255; C01B 3/386
USPC ........................................... 423/648.1
See application file for complete search history.

(56) References Cited

U.S. PATENT DOCUMENTS

| | | | |
|---|---|---|---|
| 4,946,382 | A | 8/1990 | Kobayashi et al. |
| 5,102,330 | A | 4/1992 | Ho |
| 5,795,148 | A | 8/1998 | DiMartino, Sr. et al. |
| 6,331,107 | B1 | 12/2001 | Philippe |
| 7,686,611 | B2 | 3/2010 | Joshi et al. |
| 8,126,631 | B2 | 2/2012 | Scalia, Jr. |
| 2010/0255432 | A1 | 10/2010 | Fuentes et al. |
| 2015/0113998 | A1* | 4/2015 | Tatsumi et al. ............ 60/776 |
| 2015/0217250 | A1* | 8/2015 | Cances et al. ............ 252/373 |

FOREIGN PATENT DOCUMENTS

EP    1277697    12/2006

OTHER PUBLICATIONS

M. Nikjooy, On the Modelling of Scalar and Mass Transport in Combustor Flows, International Journal for Numerical Methods in Engineering, Aug. 12, 1988, pp. 303-319, vol. 28.

* cited by examiner

*Primary Examiner* — Paul Wartalowicz

(57) ABSTRACT

A method of optimizing steam methane reforming in a multiple cell, down-fired furnace. The method includes the steps of introducing hydrocarbons and steam to a plurality of catalyst filled process tubes, combusting gases through a plurality of center cell down-fired burners at a burner discharge velocity of V m/s, and a mass flow rate of 1 kg/s, combusting gases through outer cell down-fired burners at a burner discharge velocity of 1.5V-2V m/s and a mass flow rate of 0.5-0.65 kg/s, and finally discharging combustion products from the outer cell down-fired burners and the center cell down-fired burners at a substantially uniform momentum.

6 Claims, 3 Drawing Sheets

METHOD FOR OPTIMIZING DOWN FIRED REFORMING FURNACES

CROSS REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A SEQUENCE LISTING, A TABLE, OR A COMPUTER PROGRAM LISTING APPENDIX

Not Applicable.

BACKGROUND OF THE INVENTION

1. Field of the Invention

The present invention relates to an improved method of configuring and using a furnace. More specifically, the invention relates to an improved method to reduce deflections of burner flames in down-fired, steam methane reforming furnaces in order to optimize performance.

2. Prior Art

Steam methane reforming ("SMR") processes for the production of synthesis gas are well known in the art. SMR involves a reaction of a hydrocarbon feedstock, typically in the form of natural gas, refinery gas, or naphtha, with steam at high temperatures. This reaction is in the presence of catalysts and produces a gas mixture primarily made up of hydrogen and carbon monoxide, commonly known as syngas. The syngas is collected and further processed in another system.

The SMR reaction may take place within different types of furnace configurations with burners on the top, sides, or bottom of the furnace. A typical configuration includes multiple cell or chamber furnaces with rows of down-fired burners lining each cell or chamber. Each cell is separated by vertically aligned rows of catalyst-filled process tubes.

In such a furnace, there may be several center cells and two outer cells. The outer most cells are adjacent to a refractory lined furnace wall. Therefore, they only have process tubes on one side of the cell. The center cells may vary in number from one (1) to several, depending on the furnace capacity. Each center cell is bounded by a row of process tubes along either side. The top of each cell is lined with multiple, down-fired burners.

The hydrocarbons and the steam are introduced at the top of the process tubes thereby to react with the catalyst contained within the process tubes in order to form syngas (primarily $H_2$ and CO). The syngas is removed through the bottom of the process tubes and further refined by another process. Forming syngas from hydrocarbons and steam is a highly endothermic reaction requiring much heat. The rows of down-fired burners generate flames to provide the heat necessary for the reaction. Below such flames, furnace gases and combustion products flow downward and finally out through inlets of tunnels located in each cell.

In a typical down-fired burner furnace, the center cells have process tubes on either side, therefore there is twice as much heat transfer surface in a center cell than there is in an outer cell, which is lined with process tubes on one side and then refractory lined furnace wall on the other side. Further, the outer cells normally have fifty percent to sixty-five percent (50%-65%) of the firing rate when compared to the center cells and as a result, the outer cells only have fifty percent to sixty-five percent (50%-65%) of the mass flow rate of the center cell burners.

Multiple chambered, down-fired reforming furnaces have complex gas flow patterns. Open space between each individual process tube allows for combustion products from the down-fired burners to pass into the adjacent cell, and vice versa. The combustion product flow patterns can be strong enough to cause deflections of the burner flames which ultimately leads to uneven heating of the process tubes and excessive tube metal temperatures. This combustion product flow between adjacent cells is a result of unequal flow momentum from the mass flow rate discrepancy between the outer cells and the center cells.

The larger, center burners and the smaller, outer burners are both designed for the same air pressure loss. Assuming the burners are geometrically proportional to the flow, then the velocity of the gases exiting the burner tile will be the same for both sized burners. The gases exit through a burner discharge area at a certain velocity termed a burner discharge velocity. However, the mass flow rate of the outer cell burners will be fifty percent to sixty-five percent (50%-65%) of the mass flow rate of the center cell burners. As a result, the momentum of the combustion product flow from the outer cell burners will also be fifty percent to sixty-five percent (50%-65%) of the center cell burners. The higher momentum of the center cell burners creates a lower static pressure zone at the burner discharge area near the top of the center cells than is present at the top of the outer cells. This static pressure difference causes the combustion products from the outer cells to flow toward the center cells. The combustion product flow also causes the flames from the outer cell burners to bend toward the process tubes of the center cells and in many cases, the flames cause the metal of the process tubes to overheat. Reducing the temperature of the process tubes would require reducing the firing rate of the burners which would ultimately limit the capacity of the furnace.

The foregoing gas flow problems are known in the art. Joshi et al., U.S. Pat. No. 7,686,611 B2 discloses a method and apparatus for generating straightened flames in a furnace. The method and corresponding apparatus involves the addition of oxidant conduits to introduce an oxidant to the fuel.

DiMartino, Sr., et al. U.S. Pat. No. 5,795,148 also attempts to cure the problem of unstable flame patterns and finds that wind external to the furnace is a contributing factor to the problem. DiMartino teaches an apparatus that controls the amount of air received by the furnace burners and provides uniform air pressure going to the burners.

However, neither Joshi et al., nor DiMartino, Sr. et al., nor the other prior art account for the mass flow discrepancy between the center cell burners and the outer cell burners.

It is therefore desirable to provide a method for use in a furnace which provides for substantially uniform temperatures between the multiple rows of process tubes, without the process tubes overheating.

It is further desirable to provide a method for use in a furnace which provides for the combustion product flow to have a substantially uniform momentum across outer cells and center cells.

It is further desirable to provide a method for reducing burner flame deflection and resulting impingement of flames on process tubes in a furnace.

BRIEF SUMMARY OF THE INVENTION

The present invention relates to an improved method of steam methane reforming that will reduce deflections of burner flames in down-fired, multiple cell reforming furnaces.

The present invention serves to reduce the deflections in the burner flames, and to prevent the flow of hot combustion products from the outer cells to the center cells by creating a substantially uniform combustion gas and product discharge momentum between all cell burners—outer and center. This is accomplished by increasing the burner discharge velocity through the two outer cell burners to give up to twice the burner discharge velocity as compared to the center cell burners. Because the center cell burners have a larger mass flow rate than the outer cell burners, the outer cell burners typically have 50% to 65% lesser momentum than the center cell burners. Increasing the outer cell burner discharge velocity per the method of the present invention would thus increase the outer cell burner momentum in order to give a substantially uniform momentum across all outer and center cells.

DETAILED DESCRIPTION OF THE PREFERRED EMBODIMENTS

Figure 1:
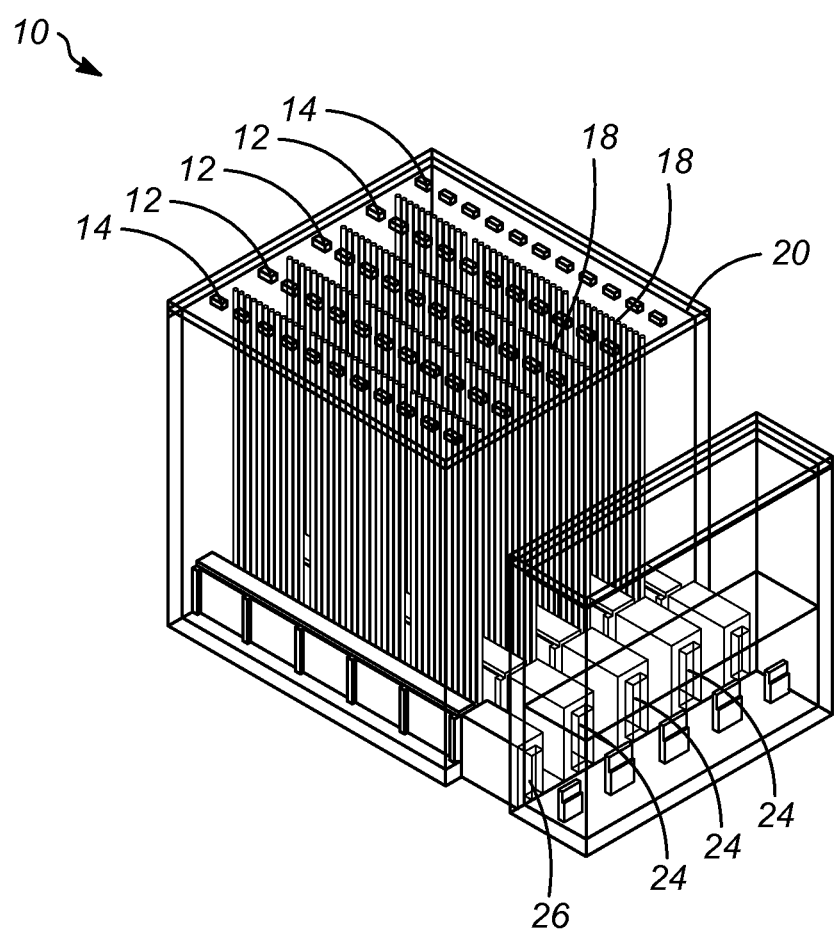
FIG. 1 is a perspective view of a down-fired, multiple cell furnace typically used in steam methane reforming.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

As shown in the drawings and understood by those skilled in the art, the method of steam methane reforming may commence in a down-fired, multiple cell reforming furnace to generate hydrogen and carbon monoxide from hydrocarbons and steam.

Referring now to FIG. 1, a perspective view of a down-fired, multiple cell furnace assembly 10 typically used in steam methane reforming is shown. The furnace has a plurality of adjacent center cells each lined with a row of burners 12. The center cells may vary in number from one to several, depending on the furnace capacity. The plurality of center cells have an outer cell on each opposed side of the center cells. The outer cells have a row of burners 14. The center cells are separated by individual rows of process tubes 18 on either side. The outer cells are separated from the center cells by a row of process tubes 18 but are adjacent to a refractory lined furnace wall 20.

In the present invention, and in typical steam methane reforming, steam and hydrocarbons are introduced at the top of the process tubes 18 which are filled with catalysts. The steam and hydrocarbons react in a chemical reaction with the catalysts to form syngas which is primarily hydrogen and carbon monoxide. The syngas is collected from the bottom of the process tubes 18 and can be further refined by other processes. The reaction between the steam, hydrocarbons and the catalysts is highly endothermic and requires much heat. This heat is provided by combustion of fuel by the rows of center and outer burners 12/14. The furnace cells are designed to guide the furnace gases and combustion products to flow from the burners 12/14 downwardly to tunnels located in each cell and finally outwardly through the outlets 24/26 of the tunnels.

Figure 2:
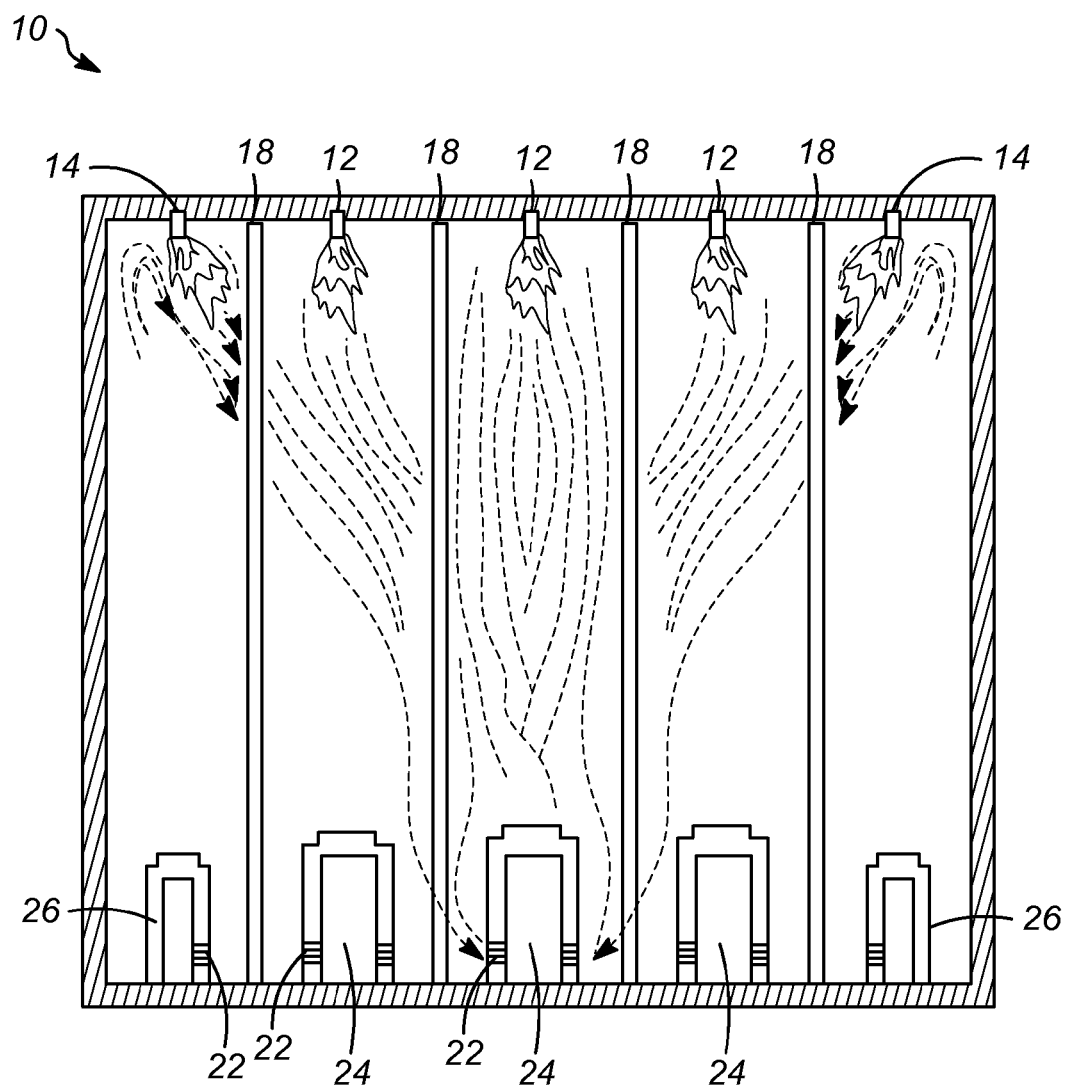
FIG. 2 is a schematic diagram illustrating a transverse view of a furnace with outer cell burner flames and combustion product flow being deflected toward the center cells before utilization of the present invention.

FIG. 2 is a schematic diagram illustrating what typically occurs in a down-fired, multiple cell furnace. The center cells with process tubes 18 on either side have twice as much heat transfer surface than the outer cells which are lined with process tubes on only one side. The outer cells' burners 14 have fifty percent (50%) to sixty-five percent (65%) of the firing rate when compared to the center cells' burners 12 and therefore, the outer cells' burners 14 have fifty percent (50%) to sixty-five percent (65%) mass flow rate as the center cells' burners 12. However, both the center cells' burners 12 and the outer cells' burners 14 are designed for the same air pressure loss. If the outer cells' burners 14 and the center cells' burners 12 are geometrically proportional to the flow, then the burner discharge velocity of the gases exiting the burners will be the same for both outer cells' burners 14 and center cells' burners 12. However, as described above, the mass flow rate of the outer cells' burners 14 is fifty percent (50%) to sixty-five percent (65%) the mass flow rate of the center cells' burners 12. This results in the combustion product flow of the outer cells' burners 14 to have a fifty percent (50%) to sixty-five percent (65%) lower momentum as the center cells' burners 12.

In current state of the art furnaces, the momentum discrepancy between the center cell burners 12 and the outer cell burners 14 creates a lower static pressure at the burner discharge area near the top of the center cell burners 12, than is present at the top of the outer cells' burners 14. This static pressure difference causes the combustion products from the outer cells to flow toward the center cells, as shown by the arrows in FIG. 2. The combustion product flow and circulation also causes the flames from the outer cells' burners 14 to bend toward the process tubes of the center cells and in many cases, the flames cause the metal of the process tubes to overheat and further causes damage to the process tubes. Therefore the momentum across both outer and center cells needs to be substantially uniform. In order to equalize momentum across all burners, the discharge velocity of the gases coming out of the outer cell burners 14 must be increased. The discharge velocity can be increased by reducing the area of the burner discharge flow restriction for the outer row burners. The reduced flow area will increase the required combustion air pressure in the outer row burners relative to the center row burners. Combustion air pressures for the center row and outer row burners can be achieved by modifications to the combustion air supply system of the furnace. Further, the necessity for combustion air pressure discrepancies between outer and center row burners can be eliminated by design modifications to the center row burners which are commonly known in the art in order to give equal combustion air pressures which can be utilized for both center and outer row burners.

Figure 3:
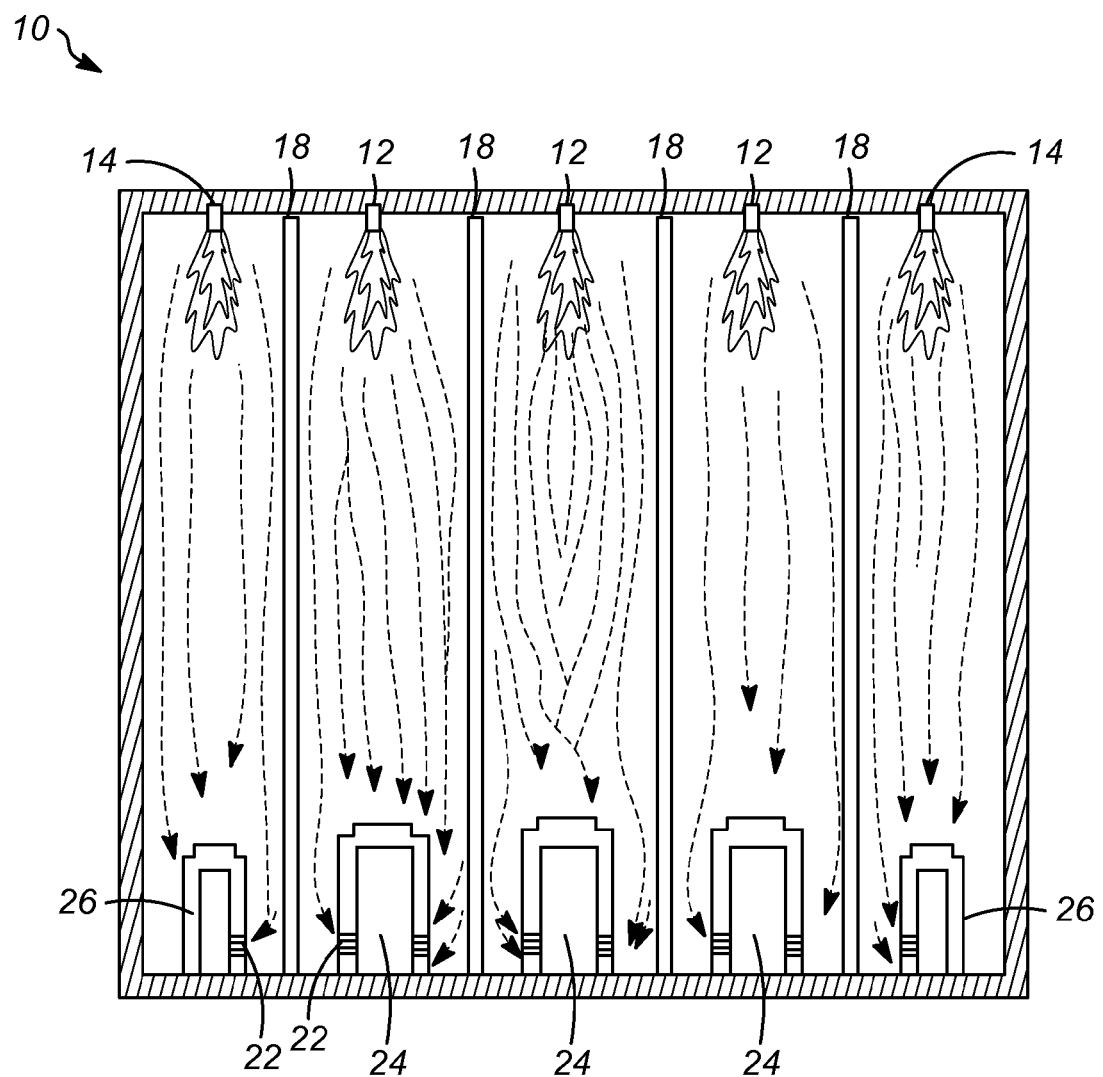
FIG. 3 is a schematic diagram illustrating a transverse view of a furnace with uniform momentum across all outer and center cell burner flames and combustion product flow, according to the present invention.

FIG. 3 is a schematic diagram illustrating the result of the method of the present invention. Hydrocarbons and steam are introduced into a plurality of process tubes 18, which are filled with catalysts. Heat is required for the hydrocarbons and steam to react with the catalysts in the process tubes 18. This heat is provided by combustion of gases through a plurality of center cell burners 12 and outer cell burners 14. In one aspect of the invention, the combustion of gases through the plurality of center cell burners 12 occurs at a burner discharge velocity of V m/s, with a mass flow rate of X kg/s. The combustion of gases through the outer cells with burners 14 occurs at a burner discharge velocity of 1.5V-2V m/s with a mass flow rate of 0.5X-0.65X kg/s. The burner discharge velocity for the outer burners 14 is increased by increasing the pressure of the gases immediately before they are discharged from the burners 14. The increased burner discharge velocity for the outer burners allows for combustion gases to discharge from the center cells' burners 12 and the outer cells' burners 14 with a substantially uniform momentum, creating a substantially equal momentum across all cells with burners 12/14.

In another aspect of the invention, the combustion of gases through the plurality of center cell burners 12 occurs at a burner discharge velocity of V m/s, with a mass flow rate of X kg/s. The combustion of gases through the outer cell burners 14 occurs at a burner discharge velocity of 2V m/s with a mass flow rate of 0.5X kg/s. Combustion gases and products discharge from the center cells with burners 12 and the outer cells with burners 14 with a substantially uniform momentum, creating a substantially equal momentum across all cells with burners 12/14.

In another aspect of the invention, the combustion of gases through down-fired burners 12 in a plurality of center cells occurs at a burner discharge velocity of V m/s, with a mass flow rate of X kg/s. The combustion of gases through the outer cells with down-fired burners 14 occurs at a burner discharge velocity of 1.5V m/s with a mass flow rate of 0.65X kg/s. Combustion gases and products discharge from the center cells with down-fired burners 12 and the outer cells with down-fired burners 14 with a substantially uniform momentum, creating a substantially equal momentum across all cell burners 12/14.

As can be seen in FIG. 3, the combustion product flow in each cell has a substantially uniform momentum that provides for a contained, straight down flow toward the inlets 22 on the tunnels of each cell. The combustion products then are removed from the furnace through outlets 24/26. Unlike with typical methods, the combustion product flow by way of the present method provides for a substantially uniform momentum that in turn gives a substantially uniform heat transfer between process tubes, and prevents flame deflection and resulting impingement of flames on the process tubes.

Whereas, the present invention has been described in relation to the drawings attached hereto, it should be understood that other and further modifications, apart from those shown or suggested herein, may be made within the spirit and scope of this invention.

What is claimed is:

1. A method of steam methane reforming in a furnace that includes a plurality of adjacent center cells with down-fired burners, and a pair of outer cells with down-fired burners on opposed sides of said plurality of center cells, said method comprising:
   steam methane reforming by first introducing methane and steam to a plurality of process tubes;
   combusting gases through said plurality of center cells with down-fired burners at a burner discharge velocity of V m/s, wherein said plurality of center cells with down-fired burners have a mass flow rate of X kg/s;
   combusting gases through said outer cells with down-fired burners at a burner discharge velocity in a range of 1.5V-2V m/s wherein said outer cells with down-fired burners have a mass flow rate in a range of 0.5X-0.65X kg/s; and
   discharging combustion products from said outer cells with down-fired burners and said plurality of center cells with down-fired burners at a substantially uniform momentum.

2. The method of steam methane reforming as described in claim 1 wherein each of said plurality of process tubes are filled with catalyst.

3. The method of steam methane reforming as described in claim 1 wherein gases are combusted through said outer cells with down-fired burners at a burner discharge velocity of 2V m/s wherein said outer cells with down-fired burners have a mass flow rate of 0.5X kg/s.

4. The method of steam methane reforming as described in claim 1 wherein gases are combusted through said outer cells with down-fired burners at a burner discharge velocity of 1.5V m/s wherein said outer cells with down-fired burners have a mass flow rate of 0.65X kg/s.

5. The method of steam methane reforming as described in claim 1 wherein said plurality of process tubes separates each of said center cells.

6. The method of steam methane reforming as described in claim 1 wherein said plurality of process tubes separates each of said pair of outer cells from said center cells.

* * * * *